US012494809B2

(12) United States Patent
Holland et al.

(10) Patent No.: US 12,494,809 B2
(45) Date of Patent: Dec. 9, 2025

(54) MIXER WITH BIAS SHARING

(71) Applicant: QUALCOMM Incorporated, San Diego, CA (US)

(72) Inventors: Kyle David Holland, San Diego, CA (US); Jang Joon Lee, San Diego, CA (US); Aleksandar Miodrag Tasic, San Diego, CA (US); Prakash Thoppay Egambaram, San Diego, CA (US); Jian Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 17/931,760

(22) Filed: Sep. 13, 2022

(65) Prior Publication Data

US 2024/0088929 A1   Mar. 14, 2024

(51) Int. Cl.
*H04W 48/18*  (2009.01)
*H03D 7/14*   (2006.01)
*H04B 1/30*   (2006.01)
*H04B 1/40*   (2015.01)

(52) U.S. Cl.
CPC .............. *H04B 1/30* (2013.01); *H03D 7/1441* (2013.01); *H04B 1/40* (2013.01)

(58) Field of Classification Search
CPC ... H04B 1/30; H04B 1/40; H04B 1/10; H04B 1/0067; H03D 7/1441; H03D 7/1458; H03D 2200/0086; H03D 7/165

USPC ....................................................... 455/552.1
See application file for complete search history.

(56) References Cited

U.S. PATENT DOCUMENTS

| 2010/0285769 | A1* | 11/2010 | Conroy | H04B 1/406 455/313 |
| 2012/0094620 | A1  | 4/2012  | Lu et al. | |
| 2014/0364076 | A1* | 12/2014 | Cha | H04B 1/30 455/295 |
| 2019/0238117 | A1  | 8/2019  | Yu et al. | |
| 2021/0266052 | A1* | 8/2021  | Fernando | H04B 3/54 |

OTHER PUBLICATIONS

Forbes T., et al., "Design and Analysis of Harmonic Rejection Mixers with Programmable LO Frequency", IEEE Journal of Solid-State Circuits, IEEE, USA, vol. 48, No. 10, Oct. 1, 2013, pp. 2363-2374, XP011527476, Figure 5, Paragraph [III. CircuitDesignandAnalysis] paragraph [IV.Measuredperformance].

(Continued)

*Primary Examiner* — Tanmay K Shah
(74) *Attorney, Agent, or Firm* — Norton Rose Fulbright LLP

(57) ABSTRACT

This disclosure provides systems, methods, and devices for wireless communications that support downconversion in a radio frequency (RF) system. In a first aspect, an apparatus for wireless communications includes a first mixer coupled to an input node; a second mixer coupled to the input node; and a first mixer bias circuit configured to output a first local oscillator (LO) signal, the first mixer bias circuit coupled to the first mixer and to the second mixer to output the first LO signal to the first mixer and to the second mixer. Other aspects and features are also claimed and described.

29 Claims, 9 Drawing Sheets

(56) References Cited

OTHER PUBLICATIONS

Ho W.G., et al., "A Low-power Two-stage Harmonic Rejection Quadrature Mixer Employing Bias-Current Reuse", 2015 IEEE 58th International Midwest Symposium on Circuits and Systems (MWSCAS), IEEE, Aug. 2, 2015, pp. 1-4, XP033218674, Figures 1(a)-1(c).
International Search Report and Written Opinion—PCT/US2023/072482—ISA/EPO—Dec. 13, 2023.

* cited by examiner

MIXER WITH BIAS SHARING

TECHNICAL FIELD

Aspects of the present disclosure relate generally to wireless communication systems, and more particularly, to radio frequency (RF) processing circuitry for wireless communication systems. Some features may enable and provide improved communications, including improved operation of RF transceivers using local oscillator (LO) signals.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Modern wireless communication networks are sophisticated networks that involve operation on multiple frequencies and multiple frequency ranges. RF signals in different frequencies and ranges may use different components or different configurations of components to support a device operating on these wireless communication networks and maintain high signal integrity and high bandwidth across a range of possible network conditions. The duplication of components and number of supported configurations presents challenges in designing RF systems for the UEs and BSs operating on wireless communication networks.

One example component used throughout an RF system is a mixer. A mixer is a component that downconverts an information signal from a signal at one frequency to a signal at a lower frequency while maintaining the information in the signal. Mixers operate by combining the information signal with a oscillating signal, with the oscillating signal being at a chosen frequency and phase offset to obtain a desired output signal at the lower frequency. The presence of multiple mixers may offer higher signal quality, which results in higher data rates at higher environmental noise levels, which improves the user experience on the wireless network. However, the presence of many mixers of various configurations results in significant duplication both of the mixers themselves but also circuitry for operating the mixers.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to aspects of this disclosure, supporting circuitry may be reduced by sharing circuitry between mixers. For example, circuitry for biasing a mixer to configure that mixer for a particular operation may be shared between mixers that operate with a similar or same configuration. A mixer bias circuit is one such circuit that may be shared, in some aspects of the disclosure, between mixers to reduce circuitry. In some embodiments, a mixer bias circuit may be shared between auxiliary mixers of a set of mixers in which the auxiliary mixers are similarly configured to operate with a same main mixer. The selection of auxiliary mixers to share the mixer bias circuit is done to equally balance a load on other circuitry such that impact to the rest of the RF system is reduced (or made negligible). For example, mixer bias circuits operate from local oscillator (LO) signals, and the loading on the LO signals is important for maintaining the phase of the LO signals with respect to each other. An unbalanced load may cause the LO signals to be less synchronized, reducing the quality of the downconverted signal, potentially resulting in lost data or operation at lower data rates. Coupling similarly configured mixers to a shared mixer bias circuit allows loading on the LO signals to remain balanced.

Some RF systems include converged receivers, in which a single RF system processes signals across multiple frequencies and/or technologies. One example converged receiver is a receiver that is configured to process multiple sub-bands of sub-6 GHz signals. For example, an RF signal may include multiple sub-6 GHz RF signals (e.g., for inter-band carrier aggregation (CA) operation), such as a combination of a B71 sub-band signal (~600 MHz) with a B2 sub-band Tx aggressor at the 3rd harmonic (~1.8 GHz). Another example converged receiver is a receiver that may be configured to process sub-6 GHz signals (e.g., 2G/3G/4G/FR1 5G) and mmWave IF signals (e.g., FR2 5G). A converged receiver may have more desense mechanisms due to relationships between the $3^{rd}$ and $5^{th}$ harmonics of the potential signal frequencies. In some embodiments of the disclosure, the mixers are part of a converged receiver, and the mixers are harmonic reject mixers (HRMs) that reduce $3^{rd}$ and $5^{th}$ harmonics. The die area of such a converged receiver is larger to accommodate sets of mixers for operating at many frequencies and the mixer's accompanying bias circuitry. The reduction of die area by sharing circuitry, such as certain mixer bias circuits, without affecting other aspects of the circuit, such as loading on the LO signals, reduces the cost of the RF receiver and likewise the wireless device operating on the wireless networks.

In some aspects, a harmonic rejection mixer (HRM) layout is disclosed wherein auxiliary mixer biasing circuits and the LO drivers for like phases are shared. The sharing reduces a number of drivers, buffers, and/or other circuitry. The auxiliary mixers may be sized at approximately 50% the size of the main mixer when there are two auxiliary mixers to maintain a common load on each of the mixer bias circuits. Other ratios of sizes may be used to maintain a balance on the LO signals based on characteristics of the main and auxiliary mixers and the ratio of number of main to auxiliary mixers. In the example of two auxiliary mixers to one main mixer, that each auxiliary mixer is half the size of the main mixer results in the load from the two auxiliary mixers on an auxiliary mixer bias circuit being similar to the load on a main mixer bias circuit from the main mixer.

In one aspect of the disclosure, an apparatus includes an input node configured to receive a radio frequency (RF) signal; a first mixer coupled to the input node; a second mixer coupled to the input node; and a first mixer bias circuit configured to output a first local oscillator (LO) signal, the first mixer bias circuit coupled to the first mixer and to the second mixer to output the first LO signal to the first mixer and to the second mixer. The received RF signal may be, for example, a sub-6 GHz RF signal, a mmWave RF signal, and/or a mmWave IF signal.

In one aspect of the disclosure, a method for wireless communication includes generating a first set of local oscillator (LO) signals for a first mixer; generating a second set of local oscillator (LO) signals for sharing between at least a second mixer and a third mixer; inputting a radio frequency (RF) signal to the first mixer, to the second mixer, and to the third mixer to determine a downconverted signal corresponding to the RF signal; and determining output data from the downconverted signal.

In an additional aspect of the disclosure, an apparatus includes at least one processor and a memory coupled to the at least one processor. The at least one processor is configured to perform operations controlling wireless communications including controlling: generating a first set of local oscillator (LO) signals for a first mixer; generating a second set of local oscillator (LO) signals for sharing between at least a second mixer and a third mixer; inputting a radio frequency (RF) signal to the first mixer, to the second mixer, and to the third mixer to determine a downconverted signal corresponding to the RF signal; and the processor configured to perform operations comprising determining output data from the downconverted signal.

In an additional aspect of the disclosure, an apparatus includes means for means for downconverting a radio frequency (RF) signal to a baseband signal, the downconverting means comprising a plurality of mixers; means for generating one or more local oscillator (LO) signals for sharing by some of the plurality of mixers of the downconverting means; and means for determining output data from the baseband signal.

In an additional aspect of the disclosure, a non-transitory computer-readable medium stores instructions that, when executed by a processor, cause the processor to perform operations. The operations include controlling wireless communications including controlling: generating a first set of local oscillator (LO) signals for a first mixer; generating a second set of local oscillator (LO) signals for sharing between at least a second mixer and a third mixer; inputting a radio frequency (RF) signal to the first mixer, to the second mixer, and to the third mixer to determine a downconverted signal corresponding to the RF signal; and the processor configured to perform operations comprising determining output data from the downconverted signal.

As used herein, a "radio frequency" signal is a signal having a frequency above baseband, which includes, in an example embodiment of a heterodyne receiver, intermediate frequency signals.

As used herein, an "intermediate frequency" signal is a RF signal that has been downconverted from another RF signal to a frequency that is above baseband, such as in an example embodiment of a heterodyne mmWave transceiver that receives a mmWave RF signal and downconverts the mmWave RF signal to a mmWave IF signal that is further processed, such as through further downconversion, to a lower frequency RF signal or a baseband signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
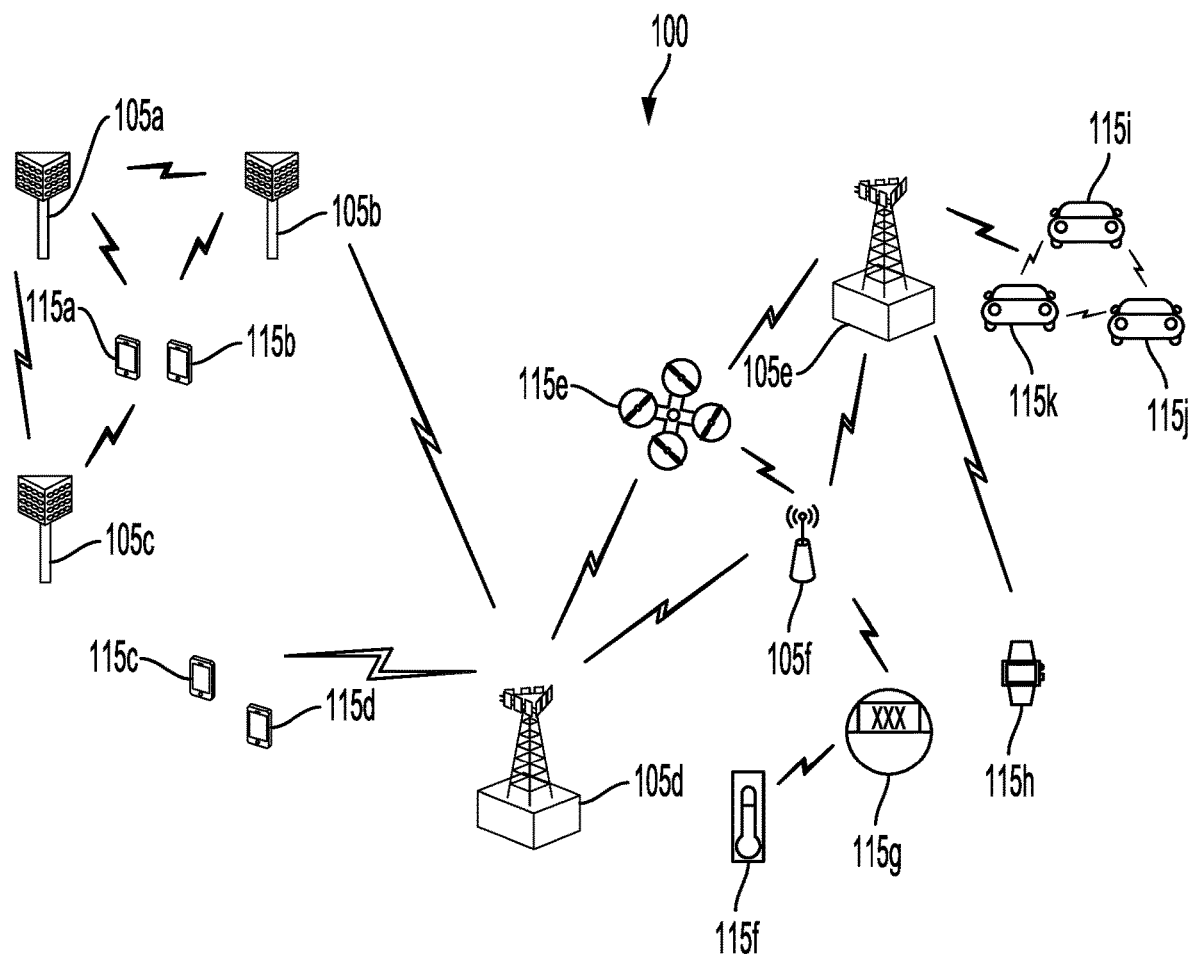
FIG. 1 is a block diagram illustrating details of an example wireless communication system according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support wireless communications. Mixers of a harmonic rejection mixer (HRM) are configured to share a mixer biasing circuit to reduce die size of the mixer and the RF transceiver that the mixer is embedded in. For example, auxiliary mixer biasing and LO drivers for like phases may be combined and shared across mixers, which may reduce a number of LO drivers and/or buffers. The sharing may be supported by sizing the auxiliary mixer to balance load across the RF transceiver on the local oscillator signals. For example, auxiliary mixers may be sized at 50% of the main mixer to balance loading between eight phases of local oscillator signals.

Particular implementations of the subject matter described in this disclosure may be implemented to realize one or more of the following potential advantages or benefits. The reduced die size and number of circuitry components reduces die size of the mixer, downconverter, and/or RF transceiver. Reduced die size allows the RF transceiver to fit in smaller devices, offering smaller form factors to the user, and reduce power consumption, offering longer mobile device operating times to the user. The shared mixer bias circuit may also provide better harmonic rejection due to the reduced number of routing asymmetries made possible by the fewer number of bias circuits.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments.

For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
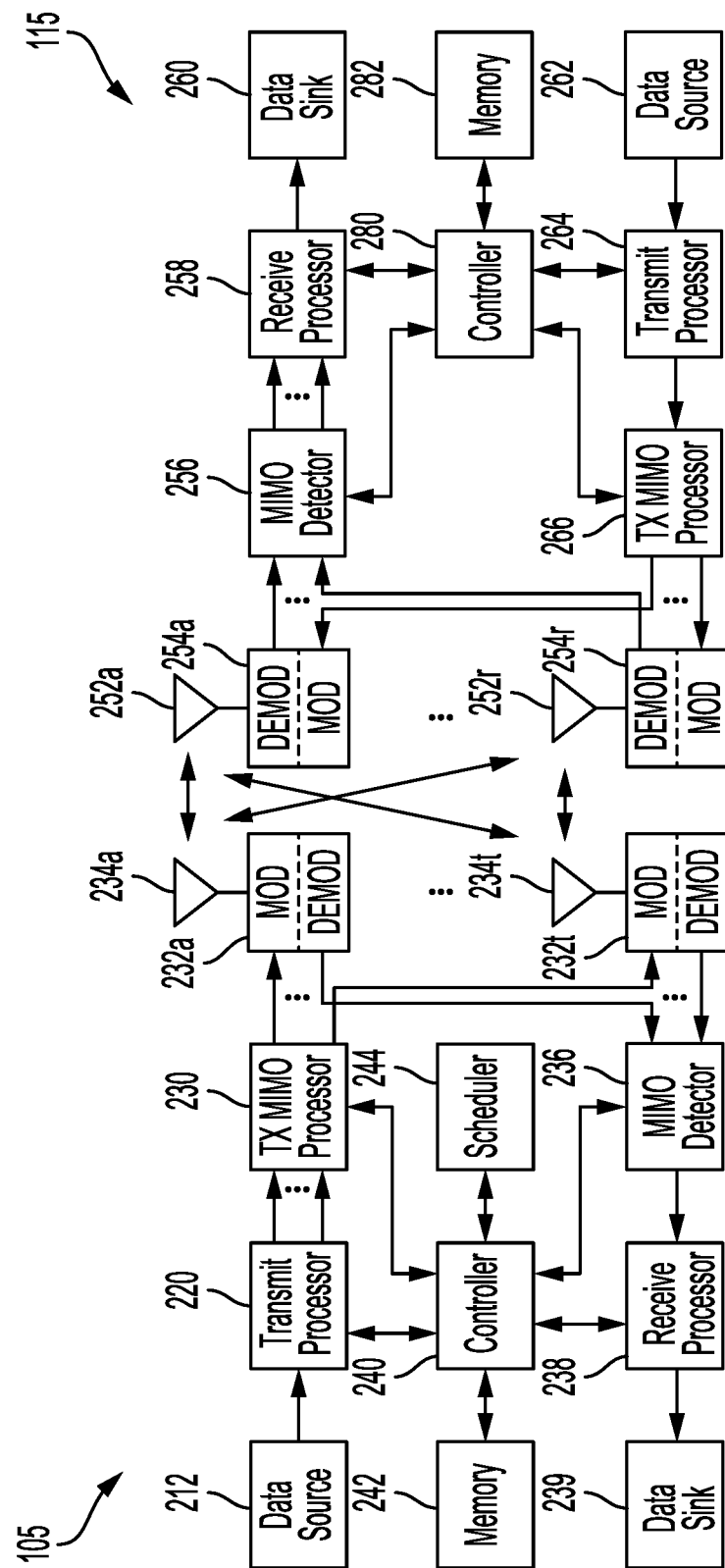
FIG. 2 is a block diagram illustrating examples of a base station and a user equipment (UE) according to one or more aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
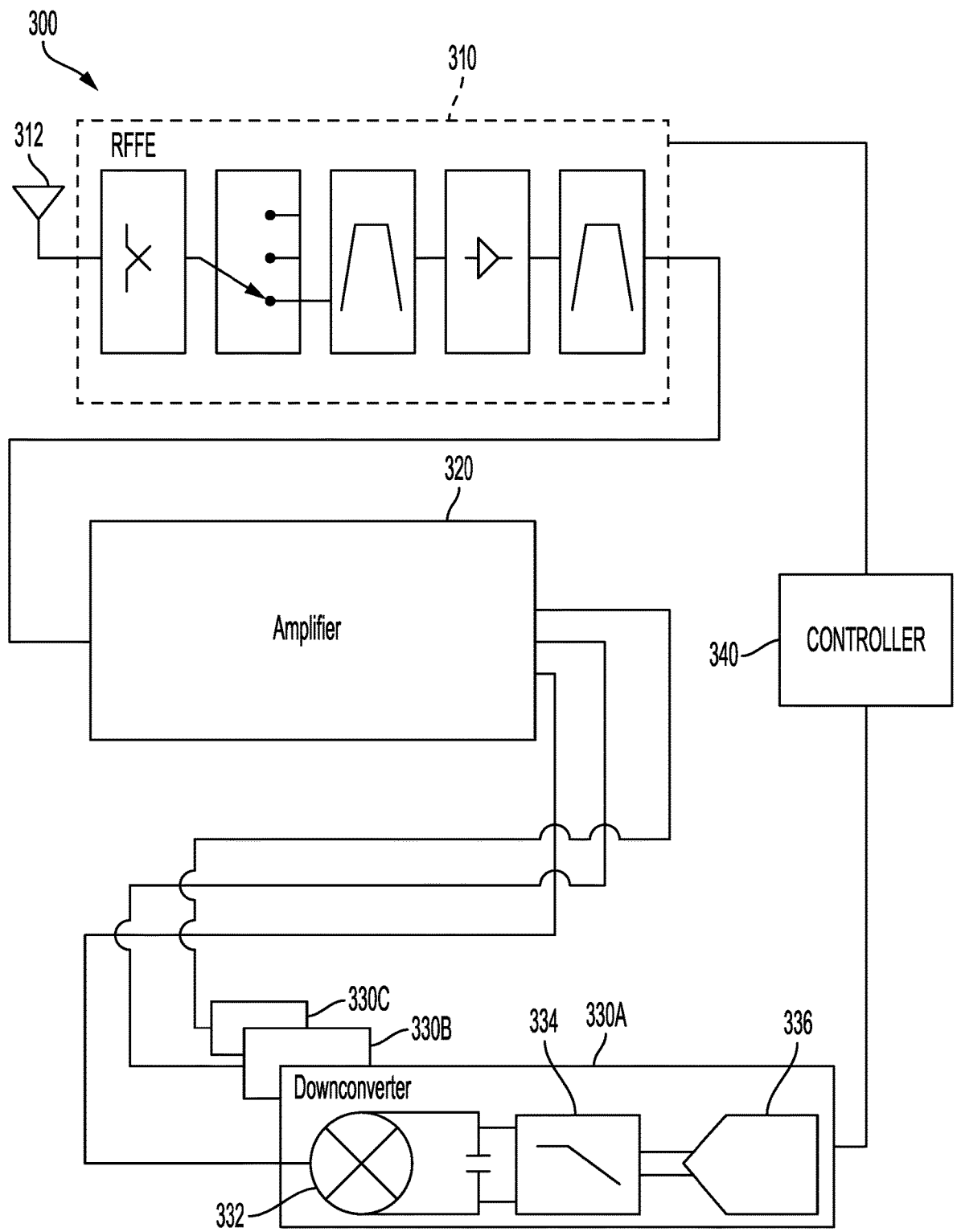
FIG. 3 is a block diagram illustrating a frequency (RF) transceiver according to one or more aspects of the disclosure.

FIG. 3 is a block diagram illustrating a wireless receiver circuit 300 according to one or more aspects. In some embodiments, the receiver circuit 300 may be part of a converged sub-6 Ghz and mmWave radio frequency (RF) transceiver, a sub-6 GHz radio frequency (RF) transceiver, or a mmWave radio frequency (RF) transceiver. In some embodiments, portions or all of the RF transceiver may be located in a single integrated circuit (IC) sharing a common substrate. The receiver circuit 300 may include an antenna 312 to receive radio frequency (RF) signals, such as a phase antenna array. The antenna 312 is coupled to a RF front-end (RFFE) 310, which may include duplexers, SAW filters, switches, LNAs, and/or other transmit or receive circuits for conditioning signals received from the antenna 312. In some embodiments, the RFFE 310 may include separate circuits for conditioning or otherwise processing sub-6 GHz signals, mmWave signals, satellite signals, and/or other signals. For example, the RFFE 310 may include a first plurality of circuits for conditioning a sub-6 GHz signal for further processing by other circuitry and a second plurality of circuits for conditioning a mmWave RF signal for further processing by other circuitry. The output of the RFFE 310 in this example may be a input RF signal to other circuitry comprising the conditioned sub-6 GHz signal and a conditioned mmWave IF signal. The RFFE 310 is coupled to an amplifier 320, such as a low noise amplifier (LNA). The amplifier 320 is coupled to one or more downconverters 330A, 330B, and 330C. Each of the downconverters 330A, 330B, and 330C may include mixers 332, baseband filters (BBFs) 334, and/or analog-to-digital converters (ADCs) 336. The downconverters 330A, 330B, 330C may include one or more harmonic rejection mixers (HRMs). In some embodiments, the amplifier 320 is shared on an IC with one or more of the RFFE 310 and/or the downconverters 330A, 330B, and 330C.

Interference between wireless signals received at antenna 312 and processed through RFFE 310, amplifier 320, and downconverters 330A-C complicates operation of the receiver circuit 300, particularly when processing a large range of potential frequencies. For example, co-location of processing paths for sub-6 Ghz and mmWave signals in an integrated circuit can create interference between the sub-6 GHz signal harmonics and the mmWave signals. Interference between sub-6 GHz signals and mmWave signals may occur because mmWave IF signals corresponding to mmWave RF signals received at an antenna from over-the-air may be located near to sub-6 GHz signals in frequency (e.g., within 1-6 GHz) and/or located at harmonics of the sub-6 GHz (e.g., at integer multiples of the sub-6 GHz signals).

Interference between wireless signals may be further complicated by carrier aggregation (CA) operation. Carrier aggregation (CA) involves the combination of one or more carrier RF signals to carry a single data stream. Carrier aggregation (CA) improves the flexibility of the wireless devices and improves network utilization by allowing devices to be assigned different numbers of carriers for different periods of time based, at least in part, on historical, instantaneous, and/or predicted bandwidth use by the wireless device. Thus, when a mobile device needs additional bandwidth, additional carriers may be assigned to that wireless device, and then de-assigned and re-assigned to other mobile devices when bandwidth demands change. As carriers are assigned and de-assigned from a mobile device, the interaction of wireless signals may change. For example, different carriers in CA may be in different bands, and certain bands may have harmonics that overlap and/or otherwise interfere with certain other bands.

A controller 340 may detect conditions in the RF signal received from the antenna 312 or receive information regarding the carrier configuration from higher levels, such as a MAC layer or network layer. The controller 340 may configure components of the receiver circuit 300 to activate, deactivate, or control portions of the receiver circuit 300 to process an input RF signal. In some embodiments, the controller 340 configures components to reduce interference between bands within the receiver circuit 300. In some embodiments, the controller 340 may configure mixers in one or more processing paths of a RF transceiver, such as within the downconverters 330A, 330B, and 330C, based on an expected or received RF input signal from the antenna.

In exemplary embodiments of the receiver circuit 300, the mixer 332 may include multiple mixers sharing a bias signal generated by a shared mixer bias circuit according to the embodiments described with reference to FIG. 4, FIG. 5, and FIG. 6.

Figure 4:
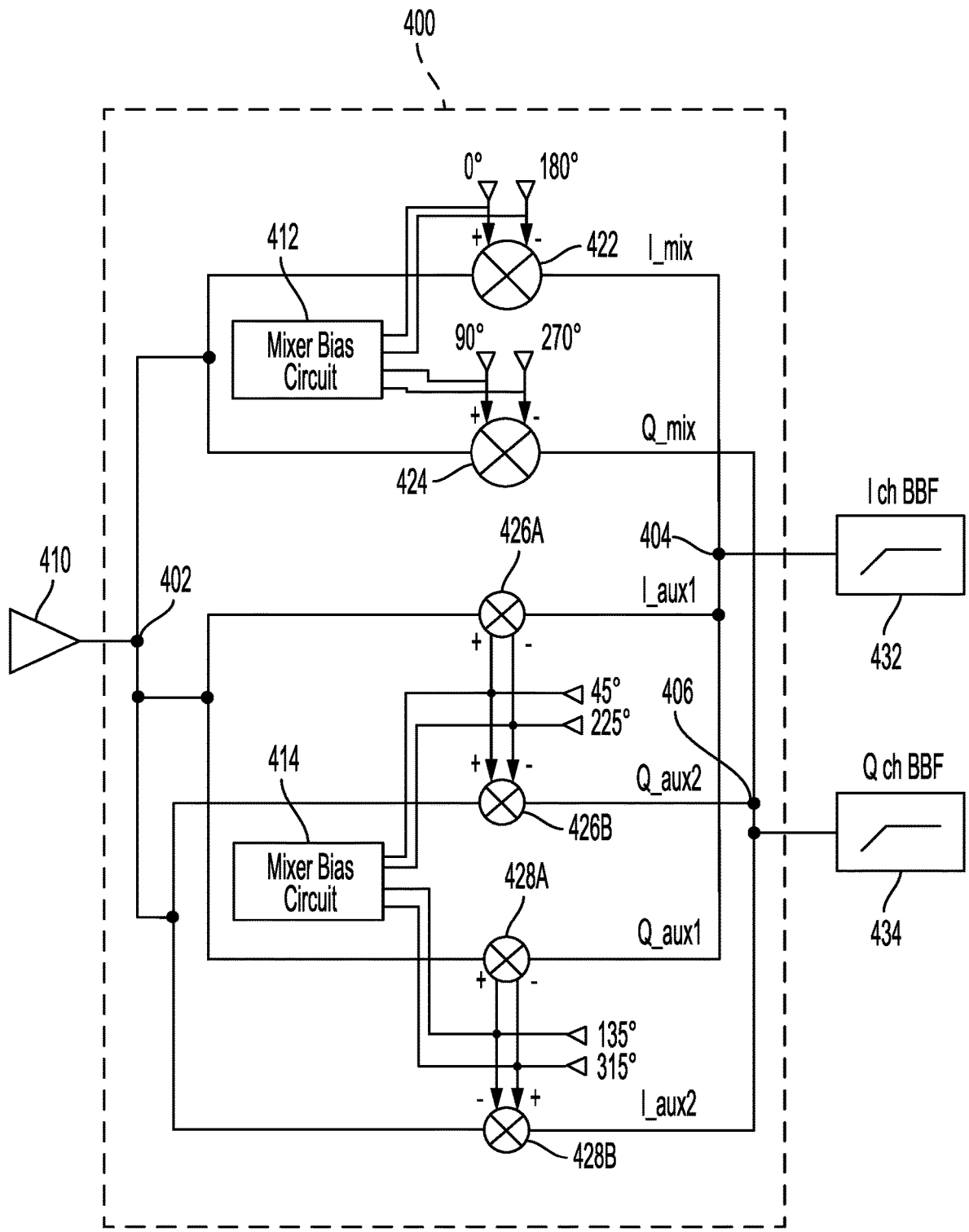
FIG. 4 is a circuit diagram illustrating a harmonic rejection mixer (HRM) with a shared mixer bias circuit according to one or more aspects of the disclosure.

FIG. 4 is a circuit diagram illustrating a harmonic rejection mixer (HRM) with a shared mixer bias circuit according to one or more aspects of the disclosure. A mixer 400 may include an input node 402 for receiving a radio frequency (RF) signal for downconversion. The input node 402 may be coupled to an amplifier 410 that is part of the mixer 332 or that is the low noise amplifier (LNA) 320. The amplifier 410 may include one or more amplifiers. For example, one amplifier 410 may drive each of the mixers 422, 424, 426A-B, and 428A-B. As another example, three amplifiers may separately drive three pairs of mixers 422-424, 426A-B, and 428A-B from one or more RF inputs. In some embodiments, the mixer 400 may be coupled to receive the antenna signal without the amplifier 410 in a mixer-first transceiver configuration. The mixer 400 includes a first output node 404 and a second output node 406 configured to output downconverted signals, which may be an intermediate frequency (IF) signal or a baseband (BB) signal. In embodiments in which the mixer 400 outputs a baseband (BB) signal, the output node 404 outputs an I-channel baseband signal and may be coupled to a I-channel baseband filter (BBF) 432 and the output node 406 outputs a Q-channel baseband signal and may be coupled to a Q-channel baseband filter (BBF) 434. A baseband processor may be coupled to the filters 432 and 434 for decoding the baseband signal.

The mixer 400 may include mixers in which some mixers share a bias signal output by a shared mixer bias circuit. A shared signal of a shared mixer bias circuit refers to a configuration in which one signal line of the mixer bias circuit is coupled to two or more mixers. In some embodiments, a shared signal may refer to a length of signal line that terminates on one end at one buffer and at the other end at two buffers. The sharing of a local oscillator (LO) signal between mixers reduces the amount of circuitry in the mixer. For example, the number of local oscillator (LO) signal drivers and buffers may be reduced. Further, the number of mixer bias circuits may be reduced, which reduces an amount of die area for the mixer.

The shared bias signal may be shared among any two or more mixers. In one example embodiment, auxiliary mixers in an I- and Q-channel arrangement may be configured to share the bias signal as shown in FIG. 4. The mixer 400 includes four auxiliary mixers: first mixer 426A, second mixer 426B, third mixer 428A, and fourth mixer 428B. The first mixer 426A and third mixer 428A may be configured as I- and Q-channel of a first auxiliary mixer, respectively. The second mixer 426B and fourth mixer 428B may be configured as I- and Q-channel of a second auxiliary mixer, respectively. A first bias circuit 414 may be coupled to apply local oscillator (LO) signals to the mixers 426A, 426B, 428A, and 428B.

At least one LO signal output by the first mixer bias circuit 414 may be shared between at least two of the mixers 426A, 426B, 428A, and 428B. For example, a first LO signal, such as a clock signal at a 45-degree phase offset, may be output to the first mixer 426A and the second mixer 426B. Additional LO signals may be shared from the mixer bias circuit 414 to the mixers. For example, a second LO signal, such as a clock signal at a 225-degree phase offset, may be output to the first mixer 426A and the second mixer 426B. As another example, a third LO signal, such as a clock signal at a 135-degree phase offset, may be output to the third mixer 428A and the fourth mixer 428B. As a further example, a fourth LO signal, such as a clock signal at a 315-degree phase offset, may be output to the third mixer 428A and the fourth mixer 428B.

The mixer 400 may include main and auxiliary mixers arranged for determining I- and Q-channel output signals. The first mixer 426A and the third mixer 428A form a first auxiliary mixer; the second mixer 426B and the fourth mixer 428B form a second auxiliary mixer. Additional mixers 422 and 424 form a primary mixer coupled to the same input node 402 as the first and second auxiliary mixers. The mixers 422 and 424 may receive LO signals from another mixer bias circuit 412. For example, the mixer bias circuit 412 may output a 0-degree and 180-degree phase offset LO signal to the mixer 422 and output a 90-degree and 270-degree phase offset LO signal to the mixer 424. The output of mixer 422 is a contribution to an I-channel baseband signal, and the output of mixer 424 is a contribution to a Q-channel baseband signal.

In the mixer 400, the auxiliary mixer biasing and LO drivers for like phases are combined, which reduces a number of LO drivers and/or buffers from 12 (if each auxiliary mixer had a separate mixer bias circuit) to 8 (in the embodiment of FIG. 4 in which two auxiliary mixers share a mixer bias circuit). The number of mixer bias circuits is reduced from 3 (one bias circuit for each of the first auxiliary, second auxiliary, and main mixer) to 2 (one shared bias circuit for the first and second auxiliary mixers, and another shared bias circuit for the main mixer), which reduces die size consumed by mixer 400 and may reduce power consumption. In some embodiments, the auxiliary mixers (e.g., mixers 426A, 426B, 428A, and 428B) are sized smaller than the main mixer (e.g., mixers 422 and 424). In some embodiments, each auxiliary mixer is approximately 50% the size of the main mixer to have an approximately equal balancing of loading between the 8 LO signals (0-degree offset signal, 45-degree offset signal, 90-degree offset signal, 135-degree offset signal, 180-degree offset signal, 225-degree offset signal, 270-degree offset signal, and 315-degree offset signal). Each of the eight LO signals may be generated from a shared voltage-controlled oscillator (VCO), which is not shown in FIG. 4, but may be coupled to the mixer bias circuits 412 and 414.

Other configurations around the mixer 400 than that shown in FIG. 4 may be used with a shared mixer bias circuit. For example, as shown in FIG. 4, each of the main mixer and two auxiliary mixers is coupled to the same amplifier 410. In some embodiments, each of the main mixer and two auxiliary mixers may be coupled to separate amplifiers in a 1:1 arrangement. Further, although one main and two auxiliary mixers are shown in mixer 400, the mixer 400 may include different number of main and auxiliary mixers in different ratios than 1:2 for main:auxiliary mixers. When more mixers are present, a shared mixer bias circuit may be shared between more than two mixers. In some embodiments, multiple baseband filters (BBFs) may be coupled to each of the I- and Q-channel outputs of the main and auxiliary mixers, such that each main or auxiliary mixer outputs to a separate I-channel baseband filter and a separate Q-channel baseband filer.

Figure 5:
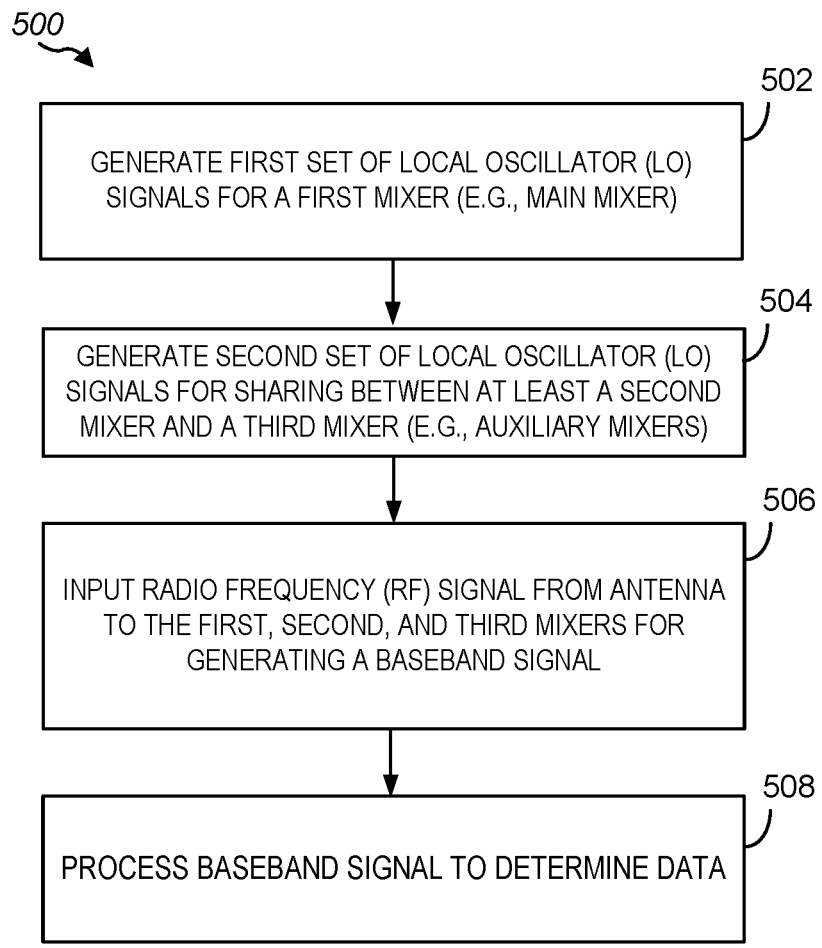
FIG. 5 is a flow chart illustrating an example method of processing an RF signal using a mixer having a shared mixer bias circuit according to one or more aspects of the disclosure.

One method for operating a mixer with at least one shared mixer bias circuit, such as the mixer 400 of FIG. 4, is shown in FIG. 5. FIG. 5 is a flow chart illustrating an example method of processing an RF signal using a mixer having a shared mixer bias circuit according to one or more aspects of the disclosure. Method 500 begins at block 502.

At block 502, a first set of local oscillator (LO) signals are generated for a first mixer, such as a main mixer of a harmonic rejection mixer (HRM).

At block 504, a second set of local oscillator (LO) signals are generated for sharing between a second mixer and a third mixer, such as two auxiliary mixers of a harmonic rejection mixer (HRM).

At block 506, an input radio frequency (RF) signal is applied to the first, second, and third mixers to obtain a downconverted signal. The RF signal may be received from one or more antennas coupled to the mixers through a radio frequency front end (RFFE). In some embodiments, the input RF signal includes a combination of sub-6 GHz and mmWave RF signals, and the mixers are configured to downconvert a frequency band within the sub-6 GHz or the mmWave frequencies. An input RF signal may include RF signals such as mmWave intermediate frequency (IF) signals. In some embodiments, the downconverted signal is a baseband signal, but may alternatively be an intermediate frequency (IF) signal that is further processed for downconversion to a baseband signal.

At block 508, the baseband signal is processed to determine data that was in the input radio frequency (RF) signal.

Figure 6:
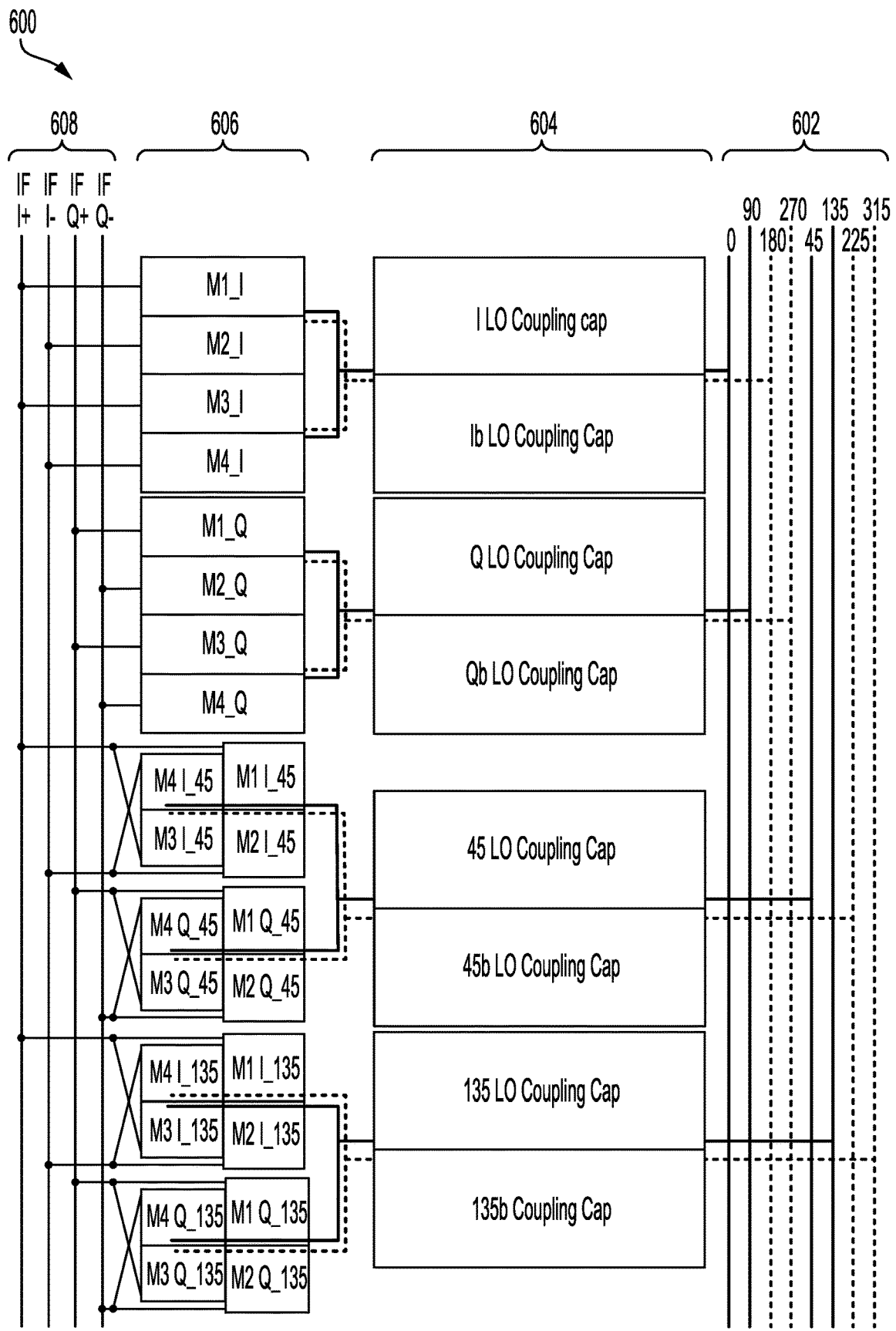
FIG. 6 is a schematic view of a portion of a semiconductor die with mixers having shared local oscillator (LO) signals according to one or more aspects of the disclosure.

One potential layout on a semiconductor die for mixers with shared LO signals is shown in FIG. 6. FIG. 6 is a schematic view of a portion of a semiconductor die with mixers having shared local oscillator (LO) signals according to one or more aspects of the disclosure. A harmonic rejection mixer (HRM) circuit 600 may include mixers 606 for downconverting an input RF signal. The mixers 606 include a first set of main mixers M1_I, M2_I, M3_I, M4_I, M1_Q, M2_Q, M3_Q, and M4_Q. The mixers 606 also include auxiliary mixers M1I_45, M2I_45, M1Q_45, M2Q_45, M1I_135, M2I_135, M1Q_135, M2Q_135, M3I_45, M4I_45, M3Q_45, M4Q_45, M3I_135, M4I_135, M3Q_135, and M4Q_135. Coupling capacitors 604 may couple the mixers 606 to LO signals 602. The LO signals 602 may be generated by one or more mixer bias circuits from one or more voltage-controlled oscillators (VCOs). Eight LO lines are shown because some of the mixers 606 share some of the LO signals. The output of mixers 606 is downconverted differential baseband signals IF I+, IF I−, IF Q+, and IF Q−. The die area occupied by mixers 606 is reduced based on the circuit 600 sharing mixer bias circuits. Further, the LO signals 602 are more evenly balanced between all phases when sharing mixer bias circuits.

In one embodiment of the semiconductor die shown in FIG. 6, the circuit 600 is configured with single-balanced mixers, coupled to a dummy M4I_45 and other dummy mixers. One possible sizing is to have M1_I45=⅔*M1_I and M4I_45=⅓*M1_I such that the signal-carrying transistor in the HRM is larger and may provide better performance. In another embodiment of the semiconductor die shown in FIG. 6, the mixer M1_I45=½*M1_I and M4I_45=½*M1_I.

Figure 7:
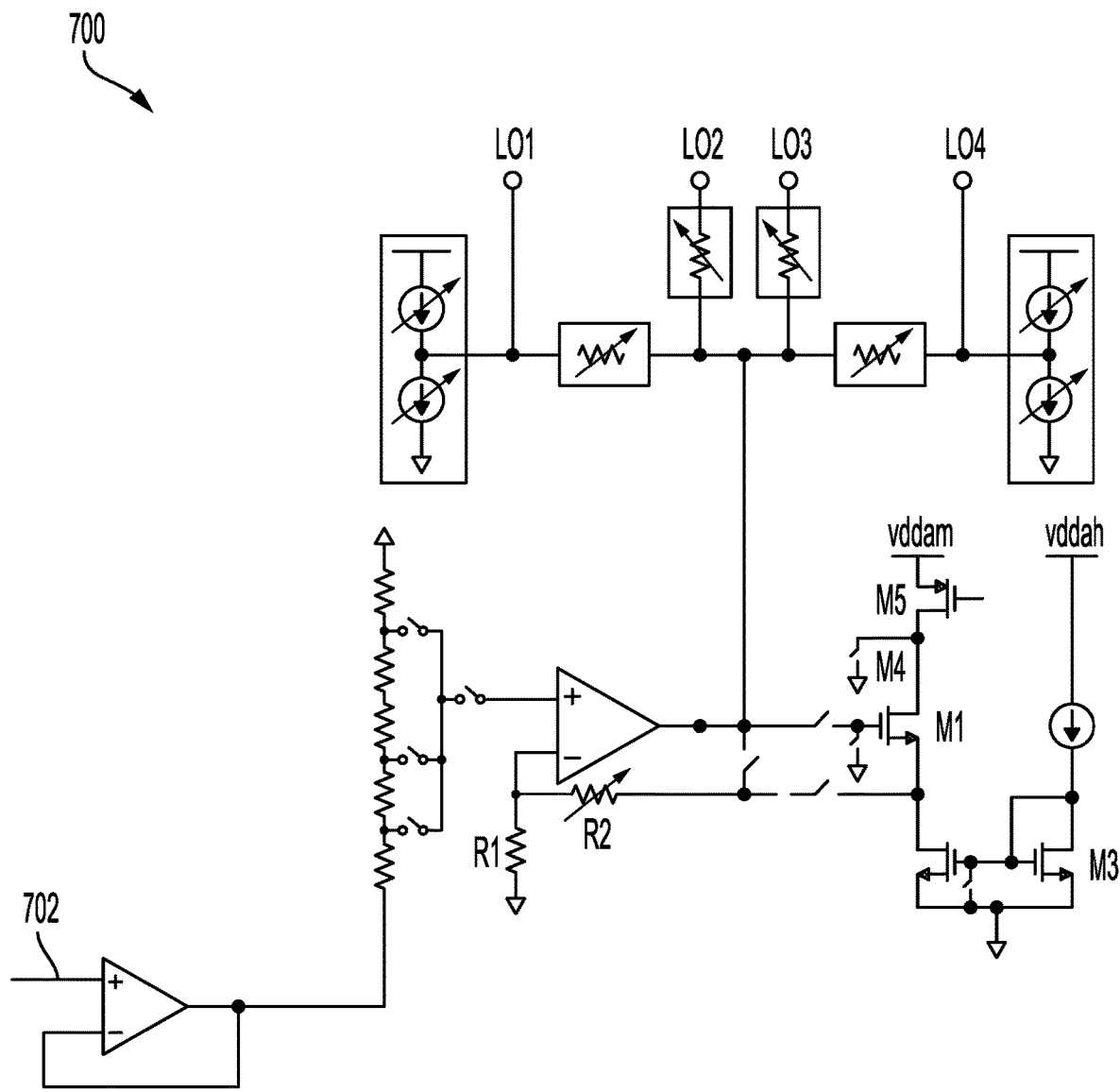
FIG. 7 is a circuit schematic illustrating a mixer bias circuit according to one or more aspects of the disclosure.

One example of a mixer bias circuit for generating the LO signals 602 of FIG. 6, and which is one embodiment of a mixer bias circuit 412 and 414 of FIG. 4, is shown in FIG. 7. FIG. 7 is a circuit schematic illustrating a mixer bias circuit according to one or more aspects of the disclosure. The mixer bias circuit 700 receives an input at input node 702 corresponding to a single clock signal. The mixer bias circuit includes amplifiers, switches, and other circuitry for generating four local oscillator (LO) signals LO1, LO2, LO3, and LO4 from the input clock signal. In an embodiment in which the mixer bias circuit 700 is used for the mixer bias circuit 414 of FIG. 4, the mixer bias circuit 700 may be configured to generate a 45-degree phase offset signal, a 225-degree phase offset signal, a 135-degree phase offset signal, and a 315-degree phase offset signal as the four LO signals LO1, LO2, LO3, and LO4.

Operations of method 5 may be performed by a UE, such as UE 115 described above with reference to FIG. 1 or FIG. 2, or a UE described with reference to FIG. 8. For example, example operations (also referred to as "blocks") of method 500 may enable UE 115 to support operation of a harmonic rejection mixer (HRM), such as in a converged receiver, for obtaining data from an antenna signal.

Figure 8:
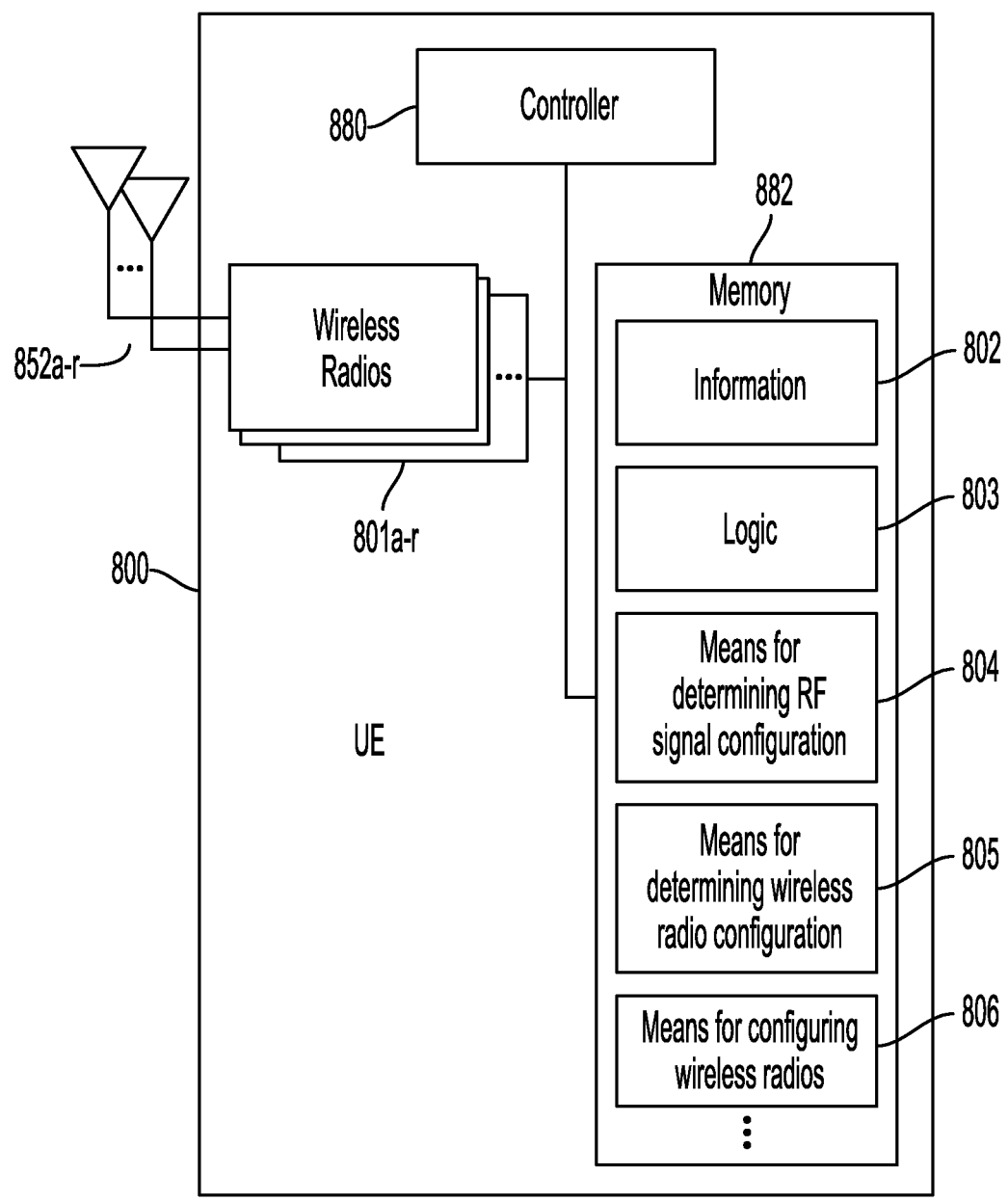
FIG. 8 is a block diagram of an example UE that supports communication user a wireless radio according to one or more aspects of the disclosure.

FIG. 8 is a block diagram of an example UE 800 that supports reconfiguring a downconverter of a wireless radio according to one or more aspects of the disclosure. UE 800 may be configured to perform operations, including the blocks of a process described with reference to the above methods. In some implementations, UE 800 includes the structure, hardware, and components shown and described with reference to UE 115 of FIG. 1 or FIG. 2. For example, UE 800 includes controller 880, which operates to execute logic or computer instructions stored in memory 882, as well as controlling the components of UE 800 that provide the features and functionality of UE 800. UE 800, under control of controller 880, transmits and receives signals via wireless radios 801*a-r* and antennas 852*a-r*. Wireless radios 801*a-r* include various components and hardware, as illustrated in FIG. 2 for UE 115, including modulator and demodulators 254*a-r*, MIMO detector 256, receive processor 258, transmit processor 264, and TX MIMO processor 266. Wireless radios 801*a-r* may also include one or more receiver circuits with downconverters configured as shown in FIG. 4.

As shown, memory 882 may include information 802, logic 803, means for determining RF signal configuration 804, means for determining wireless radio configuration 805, and/or means for configuring wireless radios 806. Information 802 may be configured to include, for example, component values for corresponding sets of active frequencies and/or carrier aggregation sets. Logic 803 may be configured to process the information 802, update the information 802, generate new configuration data for information 802, and/or store information regarding the current operating mode, e.g., assigned DL grants and/or BWPs. Means for determining RF signal configuration 804 may be configured to receive information from the wireless radios 801*a-r*, from the controller 880, and/or from information 802 to determine active frequencies in a signal received by the UE 800. Means for determining wireless radio configuration 705 may be configured to determine RF transceiver configuration, such as mixer operation, based on the determined wireless radio configuration from block 804. For example, block 805 may obtain appropriate information from a lookup table stored in information 802 using the configuration determined by block 805 as an index into the look-up table. Means for configuring wireless radios 806 may use the values determined by block 705 to change the configuration of one or more of the wireless radios 801*a-r*, such as through the controller 880. In some embodiments, some of the wireless radios 801*a-r* may be configured for mmWave operation and other of the wireless radios 801*a-r* may be configured for sub-6 GHz operation based on commands received from a base station. UE 800 may receive signals from or transmit signals to one or more network entities, such as base station 105 of FIG. 1 or FIG. 2 or a base station as illustrated in FIG. 9.

Figure 9:
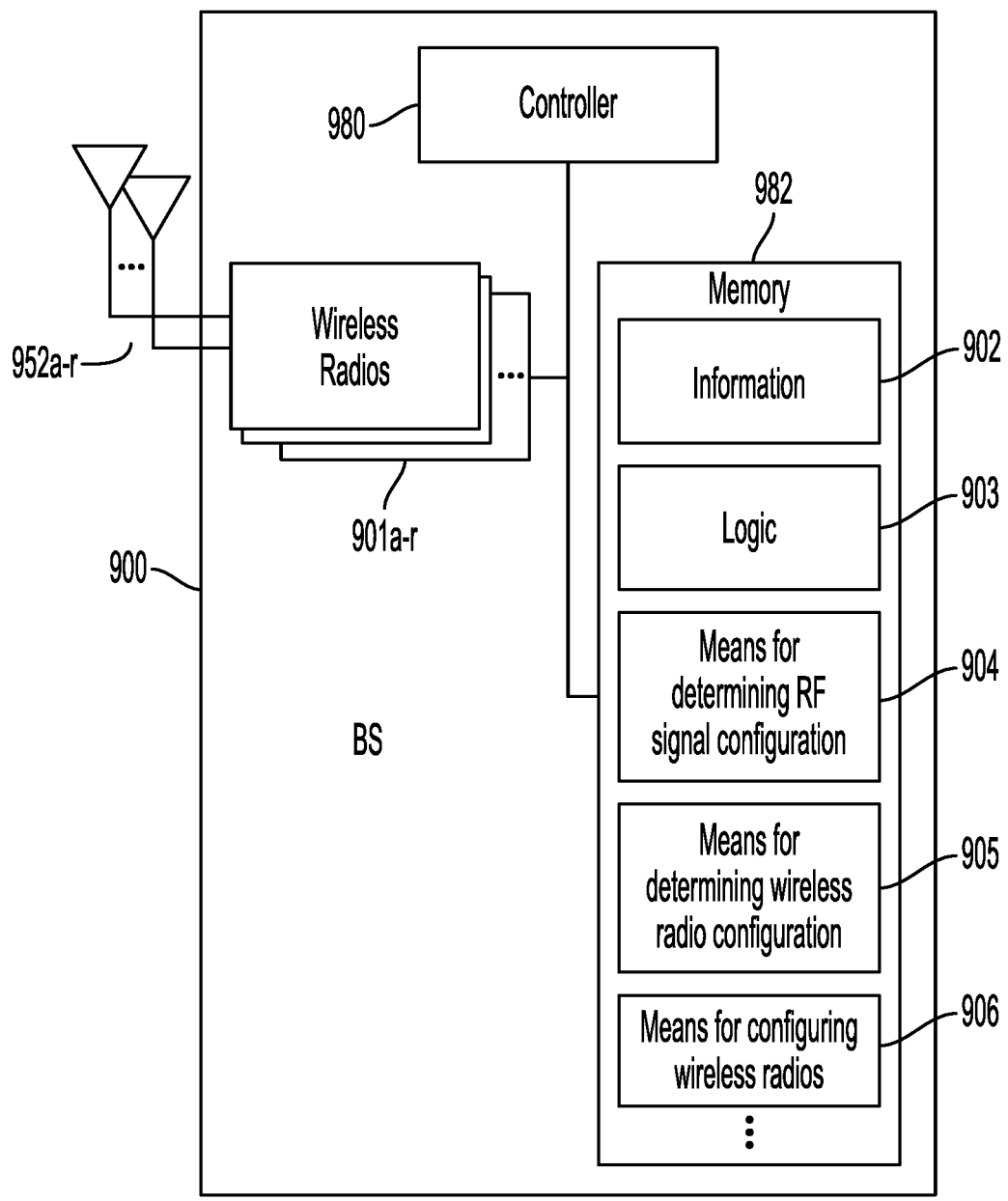
FIG. 9 is a block diagram of an example base station that supports communication using a wireless radio according to one or more aspects of the disclosure.

FIG. 9 is a block diagram of an example base station 900 that supports reconfiguring a downconverter of a wireless radio according to one or more aspects of the disclosure. Base station 900 may be configured to perform operations, including the blocks of method 500 described with reference to FIG. 5. In some implementations, base station 900 includes the structure, hardware, and components shown and described with reference to base station 105 of FIG. 1 or FIG. 2. For example, base station 900 may include controller 240, which operates to execute logic or computer instructions stored in memory 242, as well as controlling the components of base station 900 that provide the features and functionality of base station 900. Base station 900, under control of controller 240, transmits and receives signals via wireless radios 901*a-t* and antennas 934*a-t*. Wireless radios 901*a-t* include various components and hardware, as illustrated in FIG. 2 for base station 105, including modulator and demodulators 232*a-t*, transmit processor 220, TX MIMO processor 230, MIMO detector 236, and receive processor 238. Wireless radios 901*a-r* may also include one or more receiver circuits with downconverters configured as shown in FIG. 4.

As shown, memory 982 may include information 902, logic 903, means for determining carrier aggregation configuration 904, means for determining wireless radio configuration 805, and/or means for configuring wireless radios 906. Information 902 may be configured to include, for example, component values for corresponding sets of active frequencies and/or carrier aggregation sets. Logic 903 may be configured to process the information 902, update the information 902, generate new configuration data for information 902, and/or store information regarding the current operating mode, e.g., assigned DL grants and/or BWPs. Means for determining signal configuration 904 may be configured to receive information from the wireless radios 901*a-r*, from the controller 980, and/or from information 902 to determine active frequencies in a wireless signal configuration for the BS 900. Means for configuring wireless radios 906 may use the values determined by block 905 to change the configuration of one or more of the wireless radios 901*a-r*, such as through the controller 980. In some embodiments, some of the wireless radios 901*a-r* may be configured for mmWave operation and other of the wireless radios 801*a-r* may be configured for sub-6 GHz operation based on channel measurements performed by and received from a UE such as shown in FIG. 8. The means for determining wireless radio configuration 905 may use information regarding the physical location of certain wireless radios 901*a-r* relative to other wireless radios 910*a-r* to determine the degeneration component values. For example, the closeness of a mmWave wireless radio and a sub-6 GHz wireless radio may be used to determine whether interference may be generated between two frequency bands being processed through the wireless radios 901*a-r*. Base station 900 may receive signals from or transmit signals to one or more UEs, such as UE 115 of FIG. 1 or FIG. 2 or UE 800 of FIG. 8.

In one or more aspects, techniques for supporting wireless communications, such as on multiple frequency bands, may include additional aspects, such as any single aspect or any combination of aspects described below or in connection with one or more other processes or devices described elsewhere herein. In a first aspect, supporting wireless communication may include an apparatus with shared mixer bias circuitry among multiple auxiliary mixers of a harmonic reject mixer (HRM). Additionally, the apparatus may perform or operate according to one or more aspects as described below. In some implementations, the apparatus includes a wireless device, such as a UE or a base station (BS). In some implementations, the apparatus may include at least one processor, and a memory coupled to the processor. The processor may be configured to perform operations described herein with respect to the apparatus, including operations described herein with respect to methods of operating a wireless device. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, supporting wireless communication may include an apparatus configured to downconvert RF signals from a first frequency (e.g., a RF signal received from an antenna, such as a phase array antenna) to a second frequency (e.g., baseband). The apparatus includes an input node configured to receive a radio frequency (RF) signal; a first mixer coupled to the input node; a second mixer coupled to the input node; and a first mixer bias circuit configured to output a first local oscillator (LO) signal, the first mixer bias circuit coupled to the first mixer and to the second mixer to output the first LO signal to the first mixer and to the second mixer.

In a second aspect, in combination with the first aspect, the apparatus further includes a third mixer coupled to the input node; a fourth mixer coupled to the input node, wherein the first mixer bias circuit is configured to output a second local oscillator (LO) signal, the first mixer bias circuit coupled to the third mixer and to the fourth mixer to output the second LO signal to the third mixer and to the fourth mixer.

In a third aspect, in combination with one or more of the first aspect or the second aspect, the first mixer and the third mixer comprise a first auxiliary mixer, and the second mixer and the fourth mixer comprise a second auxiliary mixer.

In a fourth aspect, in combination with one or more of the first aspect through the third aspect, the first mixer bias circuit is further configured to output a third local oscillator (LO) signal and a fourth local oscillator (LO) signal, the first mixer bias circuit coupled to the first mixer and the second mixer to output the third LO signal to the first mixer and the second mixer, and the first mixer bias circuit coupled to the third mixer and the fourth mixer to output the fourth LO signal to the third mixer and to the fourth mixer.

In a fifth aspect, in combination with one or more of the first aspect through the fourth aspect, the first LO signal comprises a clock signal at a 45-degree phase offset, the second LO signal comprises the clock signal at a 135-degree phase offset, the third LO signal comprises the clock signal at a 225-degree phase offset, and the fourth LO signal comprises the clock signal at a 315-degree phrase offset.

In a sixth aspect, in combination with one or more of the first aspect through the fifth aspect, the apparatus also includes a fifth mixer coupled to the input node; a sixth mixer coupled to the input node; and a second mixer bias circuit configured to output a third local oscillator (LO) signal and a fourth local oscillator (LO) signal, the second mixer bias circuit coupled to the fifth mixer and to the sixth mixer to output the third LO signal to the fifth mixer and to output the fourth LO signal to the sixth mixer.

In a seventh aspect, in combination with one or more of the first aspect through the sixth aspect, the first mixer and the fourth mixer are configured to output to an I-channel output node, the second mixer and the third mixer are configured to output to a Q-channel output node, and the fifth mixer and the sixth mixer comprise a main mixer, the fifth mixer configured to output to the I-channel output node, and the sixth mixer configured to output to the Q-channel output node.

In an eighth aspect, in combination with one or more of the first aspect through the seventh aspect, a die size of a first auxiliary mixer comprising the first mixer and the second mixer is less than a die size of the main mixer.

In a ninth aspect, in combination with one or more of the first aspect through the eighth aspect, wherein a die size of the first mixer is half a die size of the fifth mixer, and a die size of the second mixer is half a die size of the sixth mixer.

In a tenth aspect, in combination with one or more of the first aspect through the ninth aspect, the first mixer, the second mixer, the third mixer, the fourth mixer, the fifth mixer, and the sixth mixer comprise a harmonic rejection mixer (HRM).

In an eleventh aspect, in combination with one or more of the first aspect through the tenth aspect, the input node is configured to couple to an antenna to receive the RF signal, and the RF signal comprises a first sub-6 GHz RF signal and a second sub-6 GHz RF signal at a third harmonic of the first sub-6 GHz RF signal.

In a twelfth aspect, in combination with one or more of the first aspect through the eleventh aspect, the input node is configured to couple to an antenna, and the RF signal comprises a sub-6 GHz signal and a mmWave IF signal.

In a thirteenth aspect, in combination with one or more of the first aspect through the twelfth aspect, the input node, the first mixer, and the second mixer form a portion of a first integrated circuit that is configured to couple to one or more first radio frequency front end (RFFE) receive circuits configured to condition sub-6 GHz signals, the portion of the first integrated circuit also configured to couple to one or more second RFFE receive circuits configured to condition mmWave signals.

In a fourteenth aspect, in combination with one or more of the first aspect through the thirteenth aspect, the one or more second RFFE receive circuits are configured to couple to a phased antenna array.

In a fifteenth aspect, in combination with one or more of the first aspect through the fourteenth aspect, a method for processing wireless communication signals includes generating a first set of local oscillator (LO) signals for a first mixer; generating a second set of local oscillator (LO) signals for sharing between at least a second mixer and a third mixer; inputting a radio frequency (RF) signal to the first mixer, to the second mixer, and to the third mixer to determine a downconverted signal corresponding to the RF signal; and determining output data from the downconverted signal.

In a sixteenth aspect, in combination with one or more of the first aspect through the fifteenth aspect, the first mixer comprises a main mixer, the second mixer comprises a first auxiliary mixer having an output coupled to an output of the main mixer, and the third mixer comprises a second auxiliary mixer having an output coupled to the output of the main mixer.

In a seventeenth aspect, in combination with one or more of the first aspect through the sixteenth aspect, the first auxiliary mixer and the second auxiliary mixer each have a die size less than half of the main mixer.

In an eighteenth aspect, in combination with one or more of the first aspect through the seventeenth aspect, the downconverted signal comprises a baseband (BB) signal.

In a nineteenth aspect, in combination with one or more of the first aspect through the eighteenth aspect, the RF signal comprises a sub-6 GHz RF signal and a mmWave RF signal.

In a twentieth aspect, in combination with one or more of the first aspect through the nineteenth aspect, the RF signal comprises a first sub-6 GHz RF signal and a second sub-6 GHz RF signal at a third harmonic of the first sub-6 GHz RF signal.

In a twenty-first aspect, in combination with one or more of the first aspect through the twentieth aspect, a harmonic rejection mixer (HRM) for processing wireless communication signals includes an input node for receiving an input radio frequency (RF) signal; a first output node for outputting an I-channel baseband (BB) signal; a second output node for outputting a Q-channel baseband (BB) signal; a first pair of mixers coupled to the input node and configured to output a first downconverted signal to the first output node and to output a second downconverted signal to the second output node; a second pair of mixers coupled to the input node and configured to output a first downconverted signal to the first output node and to output a second downconverted signal to the second output node; a third pair of mixers coupled to the input node and configured to output a first downconverted signal to the first output node and to output a second downconverted signal to the second output node; a first mixer bias circuit coupled to the first pair of mixers and configured to provide a first local oscillator (LO) signal and a second LO signal to a first mixer of the first pair of mixers and a third LO signal and a fourth LO signal to a second mixer of the first pair of mixers; and a second mixer bias circuit coupled to the second pair of mixers and to the third pair of mixers and configured to provide a fifth LO signal and a sixth LO signal to a first mixer of the second pair of mixers and a first mixer of the third pair of mixers and to provide a seventh LO signal and an eighth LO signal to a second mixer of the second pair of mixers and to a second mixer of the third pair of mixers.

In a twenty-second aspect, in combination with one or more of the first aspect through the twenty-first aspect, the first pair of mixers comprises a main mixer, the second pair of mixers comprises a first auxiliary mixer, and the third pair of mixers comprises a second auxiliary mixer.

In a twenty-third aspect, in combination with one or more of the first aspect through the twenty-second aspect, the size of each mixer of the second pair of mixers and the third pair of mixers is approximately half the size of each mixer of the first pair of mixers.

In a twenty-fourth aspect, in combination with one or more of the first aspect through the twenty-third aspect, the input node is coupled to one or more first radio frequency front end (RFFE) receive circuits configured to condition sub-6 GHz signals.

In a twenty-fifth aspect, in combination with one or more of the first aspect through the twenty-fourth aspect, the input node is further coupled to one or more second radio frequency front end (RFFE) receive circuits configured to condition mmWave signals, wherein the input RF signal comprises a sub-6 GHz signal and a mmWave IF signal.

In a twenty-sixth aspect, in combination with one or more of the first aspect through the twenty-fifth aspect, the first pair of mixers, the second pair of mixers, the third pair of mixer, the first mixer bias circuit, and the second mixer bias circuit are part of an integrated circuit.

In a twenty-seventh aspect, in combination with one or more of the first aspect through the twenty-sixth aspect, an apparatus for processing wireless communications signals includes means for downconverting a radio frequency (RF) signal to a baseband signal, the downconverting means comprising a plurality of mixers; means for generating one or more local oscillator (LO) signals for sharing by some of the plurality of mixers of the downconverting means; and means for determining output data from the baseband signal.

In a twenty-eighth aspect, in combination with one or more of the first aspect through the twenty-seventh aspect, the downconverting means comprises a first mixer, a second mixer, and a third mixer, and the LO signal generating means comprises: means for generating a first set of local oscillator (LO) signals for the first mixer; and means for generating a second set of local oscillator (LO) signals for sharing between at least the second mixer and the third mixer.

In a twenty-ninth aspect, in combination with one or more of the first aspect through the twenty-eighth aspect, the apparatus further includes first means for conditioning a received antenna signal to generate the radio frequency (RF) signal, wherein the first conditioning means comprises means for conditioning a sub-6 GHz RF signal.

In a thirtieth aspect, in combination with one or more of the first aspect through the twenty-ninth aspect, the apparatus further includes second means for conditioning the received antenna signal to generate the radio frequency (RF) signal, wherein the second conditioning means comprises means for conditioning a mmWave RF signal; and a phased antenna array coupled to the second conditioning means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3 and 4 may be combined with one or more blocks (or operations) described with reference to another of the figures. For example, one or more blocks (or operations) of FIG. 3 may be combined with one or more blocks (or operations) of FIG. 1. As another example, one or more blocks associated with FIG. 4 may be combined with one or more blocks (or operations) associated with FIG. 1. Additionally, or alternatively, one or more operations described above with reference to FIGS. 1-4 may be combined with one or more operations described with reference to FIGS. 5-9.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower" or "front" and "back" or "top" and "bottom" or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus, comprising:
   an input node configured to receive a radio frequency (RF) signal;
   a first mixer coupled to the input node;
   a second mixer coupled to the input node;
   a first mixer bias circuit configured to output a first local oscillator (LO) signal, the first mixer bias circuit coupled to the first mixer and to the second mixer to output the first LO signal to the first mixer and to the second mixer;
   a third mixer coupled to the input node; and
   a fourth mixer coupled to the input node,
   wherein the first mixer bias circuit is configured to output a second local oscillator (LO) signal, the first mixer bias circuit coupled to the third mixer and to the fourth mixer to output the second LO signal to the third mixer and to the fourth mixer, wherein:
   the first mixer bias circuit is further configured to output a third local oscillator (LO) signal and a fourth local oscillator (LO) signal,
   the first mixer bias circuit coupled to the first mixer and the second mixer to output the third LO signal to the first mixer and the second mixer, and
   the first mixer bias circuit coupled to the third mixer and the fourth mixer to output the fourth LO signal to the third mixer and to the fourth mixer.

2. The apparatus of claim 1, wherein:
   the first mixer and the third mixer comprise a first auxiliary mixer, and
   the second mixer and the fourth mixer comprise a second auxiliary mixer.

3. The apparatus of claim 1, wherein:
   the first LO signal comprises a clock signal at a 45-degree phase offset,
   the second LO signal comprises the clock signal at a 135-degree phase offset,
   the third LO signal comprises the clock signal at a 225-degree phase offset, and
   the fourth LO signal comprises the clock signal at a 315-degree phase offset.

4. The apparatus of claim 1, further comprising:
   a fifth mixer coupled to the input node;
   a sixth mixer coupled to the input node; and
   a second mixer bias circuit configured to output a fifth local oscillator (LO) signal and a sixth local oscillator (LO) signal, the second mixer bias circuit coupled to the fifth mixer and to the sixth mixer to output the fifth LO signal to the fifth mixer and to output the sixth LO signal to the sixth mixer.

5. The apparatus of claim 4, wherein:
   the first mixer and the fourth mixer are configured to output to an I-channel output node,
   the second mixer and the third mixer are configured to output to a Q-channel output node, and the fifth mixer and the sixth mixer comprise a main mixer, the fifth mixer configured to output to the I-channel output node, and the sixth mixer configured to output to the Q-channel output node.

6. The apparatus of claim 5, wherein a die size of a first auxiliary mixer comprising the first mixer and the second mixer is less than a die size of the main mixer.

7. The apparatus of claim 5, wherein a die size of the first mixer is half a die size of the fifth mixer, and a die size of the second mixer is half a die size of the sixth mixer.

8. The apparatus of claim 5, wherein the first mixer, the second mixer, the third mixer, the fourth mixer, the fifth mixer, and the sixth mixer comprise a harmonic rejection mixer (HRM).

9. The apparatus of claim 8, wherein:
the input node is configured to couple to an antenna to receive the RF signal, and
the RF signal comprises a first sub-6 GHz RF signal and a second sub-6 GHz RF signal at a third harmonic of the first sub-6 GHz RF signal.

10. The apparatus of claim 8, wherein:
the input node is configured to couple to an antenna, and
the RF signal comprises a sub-6 GHz signal and a mmWave IF signal.

11. The apparatus of claim 4, wherein the input node, the first mixer, and the second mixer form a portion of a first integrated circuit that is configured to couple to one or more first radio frequency front end (RFFE) receive circuits configured to condition sub-6 GHz signals, the portion of the first integrated circuit also configured to couple to one or more second RFFE receive circuits configured to condition mmWave signals.

12. The apparatus of claim 11, wherein the one or more second RFFE receive circuits are configured to couple to a phased antenna array.

13. A method, comprising:
generating a first set of local oscillator (LO) signals for a first mixer;
generating a second set of local oscillator (LO) signals for sharing between at least a second mixer and a third mixer;
inputting a radio frequency (RF) signal to the first mixer, to the second mixer, and to the third mixer to determine a downconverted signal corresponding to the RF signal; and
determining output data from the downconverted signal, wherein the first mixer comprises a main mixer, the second mixer comprises a first auxiliary mixer having an output coupled to an output of the main mixer, and the third mixer comprises a second auxiliary mixer having an output coupled to the output of the main mixer.

14. The method of claim 13, wherein the first auxiliary mixer and the second auxiliary mixer each have a die size less than half of the main mixer.

15. The method of claim 14, wherein the downconverted signal comprises a baseband (BB) signal.

16. The method of claim 13, wherein the RF signal comprises a sub-6 GHz RF signal and a mmWave RF signal.

17. The method of claim 13, wherein the RF signal comprises a first sub-6 GHz RF signal and a second sub-6 GHz RF signal at a third harmonic of the first sub-6 GHz RF signal.

18. A harmonic rejection mixer (HRM), comprising:
an input node for receiving an input radio frequency (RF) signal;
a first output node for outputting an I-channel baseband (BB) signal;
a second output node for outputting a Q-channel baseband (BB) signal;
a first pair of mixers coupled to the input node and configured to output a first downconverted signal to the first output node and to output a second downconverted signal to the second output node;
a second pair of mixers coupled to the input node and configured to output a first downconverted signal to the first output node and to output a second downconverted signal to the second output node;
a third pair of mixers coupled to the input node and configured to output a first downconverted signal to the first output node and to output a second downconverted signal to the second output node;
a first mixer bias circuit coupled to the first pair of mixers and configured to provide a first local oscillator (LO) signal and a second LO signal to a first mixer of the first pair of mixers and a third LO signal and a fourth LO signal to a second mixer of the first pair of mixers; and
a second mixer bias circuit coupled to the second pair of mixers and to the third pair of mixers and configured to provide a fifth LO signal and a sixth LO signal to a first mixer of the second pair of mixers and a first mixer of the third pair of mixers and to provide a seventh LO signal and an eighth LO signal to a second mixer of the second pair of mixers and to a second mixer of the third pair of mixers.

19. The harmonic rejection mixer of claim 18, wherein the first pair of mixers comprises a main mixer, the second pair of mixers comprises a first auxiliary mixer, and the third pair of mixers comprises a second auxiliary mixer.

20. The harmonic rejection mixer of claim 19, wherein the die size of each mixer of the second pair of mixers and the third pair of mixers is approximately half the die size of each mixer of the first pair of mixers.

21. The harmonic rejection mixer of claim 18, wherein the input node is coupled to one or more first radio frequency front end (RFFE) receive circuits configured to condition sub-6 GHz signals.

22. The harmonic rejection mixer of claim 21, wherein the input node is further coupled to one or more second radio frequency front end (RFFE) receive circuits configured to condition mmWave signals, wherein the input RF signal comprises a sub-6 GHz signal and a mmWave IF signal.

23. The harmonic rejection mixer of claim 21, wherein the first pair of mixers, the second pair of mixers, the third pair of mixer, the first mixer bias circuit, and the second mixer bias circuit are part of an integrated circuit.

24. An apparatus, comprising:
an input node configured to receive a radio frequency (RF) signal;
a first mixer coupled to the input node;
a second mixer coupled to the input node;
a first mixer bias circuit configured to output a first local oscillator (LO) signal, the first mixer bias circuit coupled to the first mixer and to the second mixer to output the first LO signal to the first mixer and to the second mixer;
a third mixer coupled to the input node;
a fourth mixer coupled to the input node, wherein the first mixer bias circuit is configured to output a second local oscillator (LO) signal, the first mixer bias circuit coupled to the third mixer and to the fourth mixer to output the second LO signal to the third mixer and to the fourth mixer;

a fifth mixer coupled to the input node;
a sixth mixer coupled to the input node; and
a second mixer bias circuit configured to output a third local oscillator (LO) signal and a fourth local oscillator (LO) signal, the second mixer bias circuit coupled to the fifth mixer and to the sixth mixer to output the third LO signal to the fifth mixer and to output the fourth LO signal to the sixth mixer.

25. The apparatus of claim 24, wherein:
the first mixer and the third mixer comprise a first auxiliary mixer, and
the second mixer and the fourth mixer comprise a second auxiliary mixer.

26. The apparatus of claim 24, wherein:
the first mixer and the fourth mixer are configured to output to an I-channel output node,
the second mixer and the third mixer are configured to output to a Q-channel output node, and
the fifth mixer and the sixth mixer comprise a main mixer, the fifth mixer configured to output to the I-channel output node, and the sixth mixer configured to output to the Q-channel output node.

27. The apparatus of claim 26, wherein a die size of a first auxiliary mixer comprising the first mixer and the second mixer is less than a die size of the main mixer.

28. The apparatus of claim 24, wherein a die size of the first mixer is half a die size of the fifth mixer, and a die size of the second mixer is half a die size of the sixth mixer.

29. The apparatus of claim 24, wherein the first mixer, the second mixer, the third mixer, the fourth mixer, the fifth mixer, and the sixth mixer comprise a harmonic rejection mixer (HRM).

* * * * *